United States Patent [19]
Planche et al.

[11] Patent Number: 6,087,420
[45] Date of Patent: Jul. 11, 2000

[54] PROCESS FOR THE PREPARATION OF POLYMER/BITUMEN COMPOSITIONS AND THEIR USE IN COATINGS

[75] Inventors: Jean-Pascal Planche, St. Just Chaleyss; Annie Zins, Seyssuel; Claude Lacour, Vienne, all of France

[73] Assignee: Elf Antar France, Courbevoie, France

[21] Appl. No.: 09/202,750

[22] PCT Filed: Apr. 17, 1998

[86] PCT No.: PCT/FR98/00788

§ 371 Date: Dec. 18, 1998

§ 102(e) Date: Dec. 18, 1998

[87] PCT Pub. No.: WO98/47966

PCT Pub. Date: Oct. 29, 1998

[30] Foreign Application Priority Data

Apr. 21, 1997 [FR] France .................................. 97 04892

[51] Int. Cl.⁷ .............................. C08L 95/00; E01C 5/12; E01C 5/22
[52] U.S. Cl. ................ 524/68; 524/59; 524/71; 427/138
[58] Field of Search ................... 524/68, 71, 59; 427/138, 136

[56] References Cited

U.S. PATENT DOCUMENTS

| | | | |
|---|---|---|---|
| 4,145,322 | 3/1979 | Meldonado et al. | 524/68 |
| 4,417,005 | 11/1983 | Tokieda et al. | 523/351 |
| 4,530,652 | 7/1985 | Buck et al. | 524/68 |
| 4,554,313 | 11/1985 | Hagenbach et al. | 524/68 |
| 4,567,222 | 1/1986 | Hagenbach et al. | 524/476 |
| 4,946,888 | 8/1990 | Yamamoto et al. | 523/351 |
| 5,234,999 | 8/1993 | Tung et al. | 525/314 |
| 5,371,121 | 12/1994 | Bellomy et al. | 524/68 |

*Primary Examiner*—Peter Szekely
*Attorney, Agent, or Firm*—Burgess, Ryan & Wayne

[57] ABSTRACT

The invention provides a method for producing bitumen/polymer compositions which consists of contacting, between 100° C. and 230° C. and under agitation, a bitumen or a mixture of bitumens with at least one styrene and butadiene copolymer having a global butadiene content ranging between 50% and 95 wt. % and a content of butadiene 1,2 double-bond structural units ranging between 12% and 50 wt % of the copolymer, and, preferably, also a sulphuring coupling agent or a functionalizing agent. The bitumen/polymer compositions are usable, directly or after dilution, for forming bitumen/polymer binders for surfacing materials.

44 Claims, No Drawings

PROCESS FOR THE PREPARATION OF POLYMER/BITUMEN COMPOSITIONS AND THEIR USE IN COATINGS

BACKGROUND OF THE INVENTION

1) Field of the Invention

The invention relates to a process for the preparation of polymer/bitumen compositions with reinforced mechanical properties. It further relates to the application of the compositions obtained to the production of polymer/bitumen binders for coatings and in particular of road surfacings, of bituminous mixes or of watertight facings and it also relates to a polymer mother solution which can be employed for the preparation of the said compositions.

2) Background Art

It is known to use bituminous compositions as various surface coatings and in particular as road surface coatings, provided that these compositions possess a certain number of essential mechanical qualities.

These mechanical qualities are assessed, in practice, by determining, by standardized tests, a series of mechanical characteristics, the most widely used of which are as follows:

softening point, expressed in ° C. and determined by the ring-and-ball test defined by NF Standard T 66008, brittleness point or Fraass point, expressed in ° C. and determined according to IP Standard 80/53, penetrability, expressed in $\frac{1}{10}$ of an mm and determined according to NF Standard T 66004, tensile Theological characteristics determined according to NF Standard T 46002 and comprising the quantities:
yield stress $\sigma_y$ in bar,
elongation at yield stress $\epsilon_y$ in %,
breaking stress $\sigma_b$ in bar,
elongation at break $\epsilon_b$ in %.

It is also possible to obtain an indication of the temperature susceptibility of bituminous compositions from a correlation between the penetrability (abbreviated to pen) and the softening point (abbreviated to RBT) of the said compositions known under the name of Pfeiffer's number (abbreviated to PN).

This number is calculated from the relationship:

$$PN = \frac{20 - 500A}{1 + 50A}$$

in which A is the slope of the straight line represented by the equation:

$$A = \frac{\log_{10} 800 - \log_{10} pen}{RBT - 25}$$

The temperature susceptibility of the bituminous composition decreases as the value of the Pfeiffer's number increases or, which comes to the same thing, as the value of the quantity A decreases. For conventional bitumens, the Pfeiffer's number takes values lying in the vicinity of zero.

In general, conventional bitumens do not simultaneously exhibit all the required qualities and it has been known for a long time that the addition of varied polymers to these conventional bitumens makes it possible to favourably modify the mechanical properties of the latter and to form polymer/bitumen compositions having improved mechanical qualities with respect to those of the bitumens alone.

Polymers capable of being added to bitumens are generally elastomers, such as polyisoprene, butyl rubber, polybutene, polyisobutene, ethylene/vinyl acetate copolymers, polymethacrylate, polychloroprene, ethyl/propylene copolymer, ethylene/propylene/diene terpolymer, polynorbornene or random or block copolymers of styrene and of a conjugated diene.

Among polymers added to bitumens, random or block copolymers of styrene and of a conjugated diene and in particular of styrene and of butadiene are particularly effective because they dissolve very easily in bitumens and confer excellent mechanical and dynamic properties on them, in particular very good viscoelasticity properties.

It is also known that the stability of polymer/bitumen compositions for which the polymer added to the bitumen is a copolymer of styrene and of a conjugated diene, such as butadiene, can be improved by reactions, carried out in situ, of chemically coupling the polymer to the bitumen by means of a sulphur-donor coupling agent (FR-A-2,376,188, FR-A-2,429,241, FR-A-2,528,439 and EP-A-0,360,656) or of functionalization of the polymer by means of a functionalization agent of the type of carboxylic acid or ester containing thiol or disulphide groups (French Patent Application No. 9512276 of Oct. 19, 1995 on behalf of the Applicant Company).

SUMMARY OF THE INVENTION

It has now been found that the beneficial effect of random or block copolymers of styrene and of butadiene on the improvement in the mechanical and rheological characteristics, in particular consistency, temperature susceptibility and tensile mechanical properties, of polymer/bitumen compositions containing these polymers, can be further improved, in particular when the polymer/bitumen compositions are crosslinked, by using a copolymer of styrene and of butadiene having a higher content of butadiene units containing a 1,2 double bond than that of the styrene/butadiene copolymers generally used.

The subject-matter of the invention is thus a process for the preparation of polymer/bitumen compositions with reinforced mechanical properties, in which a bitumen or mixture of bitumens is brought into contact, the operation being carried out at temperatures of between 100° C. and 230° C. and with stirring for a period of time of at least 10 minutes, with, with respect to the weight of the bitumen or mixture of bitumens, 0.1 to 30%, preferably 0.3% to 20% and more especially 0.5% to 10% of a copolymer of styrene and of butadiene containing 50% to 95% and more particularly 60% to 95% by weight of units resulting from butadiene, the said process being characterized in that the copolymer of styrene and of butadiene contains a proportion of units containing a 1,2 double bond resulting from butadiene of between 12% and 50% and preferably ranging from 20% to 40% by weight of the said copolymer.

DESCRIPTION OF THE PREFERRED EMBODIMENTS

The copolymer of styrene and of butadiene used in the preparation of the polymer/bitumen compositions according to the invention can advantageously be chosen from copolymers of styrene and of butadiene which exhibit a structure of linear or star block copolymers, with or without a random junction, and which have the overall content by weight of butadiene and the content of units containing a 1,2 double bond resulting from butadiene which are defined above. The weight-average molecular mass of the copolymer of styrene and of butadiene can be between 10,000 and 600,000 daltons and is preferably between 30,000 and 400,000 daltons.

The copolymers of styrene and of butadiene used according to the invention can be prepared by anionic polymerization of the monomers in the presence of initiators composed of organometallic compounds of alkali metals, in particular organolithium compounds, such as alkyllithium and very especially butyllithium, the preparation being carried out at temperatures of less than or equal to 0° C. and in solution in a solvent, which is at least partly composed of a polar solvent, such as tetrahydrofuran or diethyl ether.

According to a preferred embodiment of the preparation of the polymer/bitumen compositions according to the invention, the mass of bitumen or mixture of bitumens and of copolymer of styrene and of butadiene, which is kept stirring at temperatures of between 100° C. and 230° C. in order to form the polymer/bitumen composition, also contains at least one crosslinking agent for the composition chosen from the group formed by (i) sulphur-donor coupling agents, (ii) functionalization agents taken from carboxylic acids or esters containing thiol or disulphide groups and (iii) peroxide compounds which generate free radicals at temperatures of between 100° C. and 230° C.

The bitumen or mixture of bitumens which is employed for the implementation of the process according to the invention is advantageously chosen from the various bitumens which have a kinematic viscosity at 100° C. of between $0.5 \times 10^{-4}$ m²/s and $3 \times 10^{-2}$ m²/s and preferably between $1 \times 10^{-4}$ m²/s and $2 \times 10^{-2}$ m²/s. These bitumens may be direct distillation or vacuum distillation bitumens or else blown or semiblown bitumens, propane or pentane deasphalting residues, viscosity breaking residues, indeed even some petroleum cuts or mixtures of bitumens and of vacuum distillates or alternatively mixtures of at least two of the products which have just been listed. Besides a kinematic viscosity included within the abovementioned ranges, the bitumen or mixture of bitumens employed in the process according to the invention advantageously has a penetrability at 25° C., defined according to NF Standard T 66004, of between 5 and 900 and preferably between 10 and 400.

In addition to the copolymer of styrene and of butadiene with a content of units containing a 1,2 double bond resulting from butadiene as defined above, the polymer/bitumen composition according to the invention, whether crosslinked or non-crosslinked, can also contain one or more additional polymers other than the said copolymer of styrene and of butadiene, the said additional polymer or polymers being in particular olefinic polymers, such as polyethylene, polypropylene, polybutene, polyisobutene, ethylene/vinyl acetate copolymers, ethylene/propylene copolymers, ethylene/propylene/diene terpolymers, ethylene/alkyl acrylate or methacrylate copolymers, or polymers such as polybutadiene, polyisoprene or polynorbornene, or else functionalized olefinic polymers containing epoxy or COOH groups, such as ethylene/glycidyl acrylate or methacrylate copolymers, ethylene/alkyl acrylate or methacrylate/ glycidyl acrylate or methacrylate terpolymers and in particular ethylene/methyl acrylate/glycidyl methacrylate terpolymer, and ethylene/alkyl acrylate or methacrylate/ maleic anhydride terpolymers and in particular ethylene/ butyl acrylate/maleic anhydride terpolymer.

The amount of the additional polymer or polymers in the polymer/bitumen composition can be between 0.3% and 20% and preferably between 0.5% and 10% of the weight of the bitumen in the said composition.

The sulphur-donor coupling agent which is employed to produce a crosslinked polymer/bitumen composition can be composed of a product chosen from the group formed by elemental sulphur, hydrocarbyl polysulphides, sulphur-donor vulcanization accelerators or mixtures of such products with one another and/or with vulcanization accelerators which are not sulphur donors. In particular, the sulphur-donor coupling agent is chosen from the products M, which contain, by weight, from 0% to 100% of a component CA composed of one or more sulphur-donor vulcanization accelerators and from 100% to 0% of a component CB composed of one or more vulcanizing agents chosen from elemental sulphur and hydrocarbyl polysulphides, and the products N, which contain a component CC composed of one or more vulcanization accelerators which are not sulphur donors and a product M in a ratio by weight of the component CC to the product M ranging from 0.01 to 1 and preferably from 0.05 to 0.5.

The elemental sulphur capable of being employed for constituting, partially or entirely, the coupling agent is advantageously sulphur in flower form and preferably sulphur crystallized in the orthorhombic form and known by the name of alpha sulphur.

The hydrocarbyl polysulphides capable of being employed to form part or all of the coupling agent may be chosen from those which are defined in the citation FR-A-2,528,439 and which correspond to the general formula $R_8$—$(S)_m$—$(R_9$—$(S)_m$—$)_w$—$R_{10}$ in which $R_8$ and $R_{10}$ each denote a saturated or unsaturated, $C_1$ to $C_{20}$ monovalent hydrocarbon radical or are connected to one another to constitute a saturated or unsaturated, $C_1$ to $C_{20}$ divalent hydrocarbon radical forming a ring with the other groups of atoms associated in the formula, $R_9$ is a saturated or unsaturated, $C_1$ to $C_{20}$ divalent hydrocarbon radical, the —$(S)_m$— groups represent divalent groups each formed from m sulphur atoms, the values m being able to differ from one of the said groups to another and denoting integers ranging from 1 to 6 with at least one of the values of m equal to or greater than 2 and w represents an integer assuming values from zero to 10. Preferred polysulphides correspond to the formula $R_{11}$—$(S)_p$—$R_{11}$, in which $R_{11}$ denotes a $C_6$ to $C_{16}$ alkyl radical, for example hexyl, octyl, dodecyl, tert-dodecyl, hexadecyl, nonyl or decyl, and —$(S)_p$— represents a divalent group formed from a chain sequence of p sulphur atoms, p being an integer ranging from 2 to 5.

When the coupling agent contains a sulphur-donor vulcanization accelerator, the latter may be chosen in particular from the thiuram polysulphides of formula

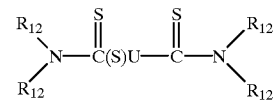

in which the symbols $R_{12}$, which are identical or different, each represent a $C_1$ to $C_{12}$ and preferably $C_1$ to $C_8$ hydrocarbon radical, especially an alkyl, cycloalkyl or aryl radical, or else two $R_{12}$ radicals attached to the same nitrogen atom are bonded together to form a $C_2$ to $C_8$ divalent hydrocarbon radical and u is a number ranging from 2 to 8. As examples of such vulcanization accelerators, there may be mentioned especially the compounds: dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

As other examples of sulphur-donor vulcanization accelerators, there may also be mentioned alkylphenol disulphides and disulphides such as morpholine disulphide and N,N'-caprolactam disulphide.

Vulcanization accelerators which are not sulphur donors and which can be employed for forming the component CC of the coupling agents of product N type may be sulphur compounds chosen especially from mercaptobenzothiazole and its derivatives, especially benzothiazole metal thiolates and above all benzothiazolesulphenamides, dithiocarbamates of formula

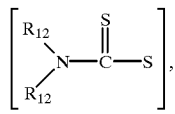

in which the symbols $R_{12}$, which are identical or different, have the meaning given above, Y represents a metal and f denotes the valency of Y, and thiuram monosulphides of formula

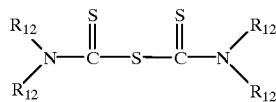

in which the symbols $R_{12}$ have the meaning given above.

Examples of vulcanization accelerators of the mercaptobenzothiazole type can be mercaptobenzothiazole, benzothiazolethiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides in the case of which the hydrocarbyl radical is an ethyl, isopropyl, tert-butyl or cyclohexyl radical, and N-oxydiethylene-2-benzothiazolesulphenamide.

Among the vulcanization accelerators of the dithiocarbamate type of the abovementioned formula, there may be mentioned the compounds which are dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

By way of examples of thiuram monosulphides which have the formula given above, there may be mentioned compounds such as dipentamethylenethiuram monosulphide, tetramethylthiuram monosulphide, tetraethylthiuram monosulphide and tetrabutylthiuram monosulphide.

Other vulcanization accelerators which are not sulphur donors and which do not belong to the classes defined above may also be employed. Such vulcanization accelerators can be 1,3-diphenylguanidine, di-orthotolylguanidine and zinc oxide, the latter compound being used optionally in the presence of fatty acid.

For further details on the sulphur-donor vulcanization accelerators and those which are not sulphur donors which can be used in the formation of the sulphur-donor coupling agent, reference may be made to citations EP-A-0,360,656 and EP-A-0,409,683, the contents of which are incorporated in the present description by reference, as are the contents of citation FR-A-2,528,439.

As follows from its composition, as indicated above, the coupling agent may be of the single-component or of the multicomponent type, it being possible for the coupling agent of the multicomponent type to be formed before it is used or alternatively produced in situ in the mixture in which it must be present. The coupling agent of the preformed multicomponent type or of the single-component type or the components of the coupling agent of the multicomponent type formed in situ may be used as they are, for example in the molten state, or else as a mixture, for example in solution or in suspension, with a diluent, for example a hydrocarbon compound.

The coupling agent is used in an amount appropriate for providing an amount of free sulphur representing 0.1% to 20% and preferably 0.5% to 10% of the weight of the copolymer of styrene and of butadiene used in the preparation of the polymer/bitumen composition crosslinked by the coupling agent.

The functionalization agent which is used to produce a functionalized polymer/bitumen composition is composed of at least one compound of formula

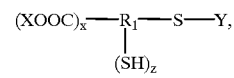

in which Y denotes a hydrogen atom or a monovalent residue

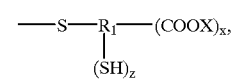

$R_1$ denotes an (x+z+1)-valent $C_1$ to $C_{12}$, preferably $C_1$ to $C_8$, hydrocarbon radical, X represents H or a monovalent $C_1$ to $C_{12}$ and preferably $C_1$ to $C_8$ hydrocarbon radical R, z is equal to zero or one and x is an integer having a value ranging from 1 to 3 and preferably equal to 1 or 2, with x+y≦3.

The functionalization agent is advantageously composed of at least one compound having the formula $Y_1$—S—$R_3$—(COOX)$_x$, where Y denotes H or a monovalent residue —S—$R_3$—(COOX)$_x$, and in particular the formula $Y_2$—S—$R_3$—(COOH)$_x$, where $Y_2$ represents H or a monovalent residue —S—$R_3$—(COOH)$_x$, $R_3$ denotes an (x+1)-valent $C_1$ to $C_{12}$ and preferably $C_1$ to $C_8$ hydrocarbon radical and X and x have the meanings given above.

In the abovementioned formulae of the functionalization agent, the (x+y+1)-valent hydrocarbon radical $R_1$, the (x+1)-valent radical $R_3$ and the monovalent hydrocarbon radical R can each represent a saturated, linear or branched, $C_1$ to $C_{12}$ and preferably $C_1$ to $C_8$ aliphatic radical, an unsaturated, linear or branched, $C_2$ to $C_{12}$ and preferably $C_2$ to $C_8$ aliphatic radical, a $C_4$ to $C_{12}$ and preferably $C_6$ to $C_8$ cycloaliphatic radical or a $C_6$ to $C_{12}$ and preferably $C_6$ to $C_8$ aromatic radical. The radical R is preferably a linear or branched, $C_1$ to $C_{12}$ and more especially $C_1$ to $C_8$ alkyl radical, such as, for example, methyl, ethyl, propyl, butyl, isobutyl, isooctyl, 2-ethylhexyl, n-hexyl or n-octyl.

Mention may be made, as examples of functionalization agent corresponding to the formulae given above, of:

(i) thiolcarboxylic acids, such as thiolacetic acid (thioglycolic acid) of formula HS—$CH_2$—COOH, thiolpropionic acid of formula HS—$CH_2$—$CH_2$—COOH, thiolbutanoic acid of formula HS—$CH_2$—$CH_2$—$CH_2$—COOH, mercaptosuccinic acid of formula

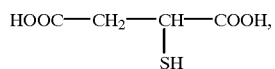

dimercaptosuccinic acid of formula

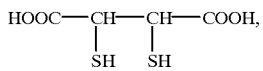

thiosalicylic acid of formula

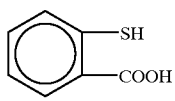

(ii) disulphide compounds, such as 2,2'-dithiodiacetic acid of formula HOOC—$CH_2$—S—S—$CH_2$—COOH, 3,3'-dithiodipropionic acid of formula HOOC—$CH_2$—$CH_2$—S—S—$CH_2$—$CH_2$—COOH, 4,4'-dithiodibutanoic acid of formula HOOC—$(CH_2)_3$—S—S$(CH_2)_3$—COOH and 2,2'-dithiodisalicylic acid of formula

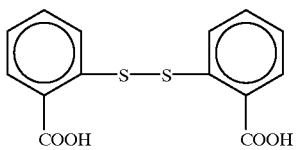

and (iii) esters deriving from the said acids exemplified above, by replacement of the —COOH functional groups by ester functional groups —COOR', where R' is a $C_1$ to $C_{12}$ and more particularly $C_1$ to $C_8$ alkyl radical, such as, for example, methyl, ethyl, propyl, butyl, isobutyl, 2-ethylhexyl, n-octyl or isooctyl.

The functionalization agent is used in an amount of between 0.01% and 6% and more especially between 0.05% and 3% of the weight of bitumen or mixture of bitumens employed to produce the functionalized polymer/bitumen composition.

The peroxide compound, which is a generator of free radicals at temperatures between 100° C. and 200° C., can be used alone as coupling agent, in order to produce a crosslinked polymer/bitumen composition, or else can be employed in combination with the functionalization agent, in order to produce a functionalized polymer/bitumen composition. The said peroxide compound, which is used in an amount ranging from 0% up to, for example, 15% by weight of the copolymer of styrene and of butadiene, can be chosen in particular from dihydrocarbyl peroxides, such as di-tert-butyl peroxide and dicumyl peroxide.

The non-crosslinked or non-functionalized polymer/bitumen composition is prepared by bringing the copolymer of styrene and of butadiene with a specific content of units containing a 1,2 double bond resulting from butadiene and, if appropriate, the additional polymer or polymers into contact with the bitumen or mixture of bitumens, in proportions chosen within the ranges defined above, the operation being carried out at temperatures of between 100° C. and 230° C., more particularly between 120° C. and 190° C., and with stirring, for a period of time of at least 10 minutes, generally of the order of a few tens of minutes to a few hours and for example from 10 minutes to 8 hours and more particularly from 10 minutes to 5 hours, to form a homogeneous mass constituting the non-crosslinked and non-functionalized polymer/bitumen composition (polymer/bitumen component). When an additional polymer, for example ethylene/vinyl acetate copolymer or olefinic polymer functionalized by epoxy or COOH groups, is used in addition to the copolymer of styrene and of butadiene, the said additional polymer can be brought into contact with the bitumen or mixture of bitumens before or after the copolymer of styrene and of butadiene or even at the same time as the latter.

When it is desired to produce a crosslinked polymer/bitumen composition, a non-crosslinked polymer/bitumen component composed of a bitumen or mixture of bitumens containing the copolymer of styrene and of butadiene in the non-crosslinked state and, if appropriate, the optional additional polymer or polymers is first of all formed, the operation being carried out as indicated above, the sulphur-donor coupling agent or the peroxide compound is then incorporated in the said non-crosslinked polymer/bitumen component, in an appropriate amount chosen within the ranges defined above for the said amount, and the whole mixture is kept stirring at temperatures of between 100° C. and 230° C., more particularly between 120° C. and 190° C., and identical or not to the temperatures for the preparation of the non-crosslinked polymer/bitumen component, for a period of time of at least 10 minutes and generally ranging from 10 minutes to 5 hours, more particularly from 30 minutes to 3 hours, to form a reaction mass constituting the crosslinked polymer/bitumen component.

When it is desired to produce a functionalized polymer/bitumen composition, a non-functionalized polymer/bitumen component composed of a bitumen or mixture of bitumens containing the copolymer of styrene and of butadiene in the non-crosslinked state and, if appropriate, the optional additional polymer or polymers is first of all formed, the operation being carried out as indicated above, the functionalization agent and subsequently, if it is used, the peroxide compound are then incorporated in the said non-functionalized polymer/bitumen component, in appropriate amounts chosen within the ranges defined above for the said amounts, and the whole mixture is kept stirring at temperatures of between 100° C. and 230° C., more particularly between 120° C. and 190° C., and identical or not to the temperatures of formation of the polymer/bitumen component, for a period of time of at least 10 minutes and generally ranging from 10 minutes to 5 hours, more particularly from 30 minutes to 3 hours, to form a reaction product constituting the functionalized elastomer/bitumen composition.

During its formation, the non-crosslinked or non-functionalized polymer/bitumen composition (polymer/bitumen component) or the crosslinked or functionalized polymer/bitumen composition may further have added to it 1% to 40% and more particularly 2% to 30%, by weight of the bitumen, of a fluxing agent which may be composed, in particular, of a hydrocarbon oil exhibiting an atmospheric pressure distillation range, determined according to ASTM Standard D 86-67, of between 100° C. and 600° C. and lying more especially between 150° C. and 400° C. This hydrocarbon oil, which can especially be a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin, is sufficiently "heavy" to limit the evaporation at the time of its addition to the bitumen and, at the same time, sufficiently "light" to be removed as much as possible after the polymer/bitumen composition containing it has been spread, so as to regain the same mechanical properties which the polymer/bitumen composition prepared without employing any fluxing agent would have exhibited after hot spreading. The fluxing agent can be added to the mixture, which is formed from the bitumen, from the copolymer of styrene and of butadiene and, if appropriate, from the optional additional polymer or polymers and from the coupling agent or from the functionalization agent, at any time in the formation of the said mixture, the amount of fluxing agent being chosen, within the ranges defined above, in order to be compatible with the desired final use on the work site.

The reaction product constituting the functionalized polymer/bitumen composition can advantageously have added to it, the operation being carried out with stirring at temperatures of between 100° C. and 230° C. and more particularly between 120° C. and 190° C., one or more additives capable of reacting with the carboxylic acid or carboxylic ester functional groups carried by the copolymer of styrene and of butadiene and optionally by the bitumen of the functionalized polymer/bitumen composition in order to activate or reinforce the crosslinking between the macromolecular chains of the said copolymer and/or between the said macromolecular chains and the bitumen and thus to reinforce the physicomechanical characteristics of the functionalized polymer/bitumen composition. These reactive additives can be, in particular, primary or secondary amines, especially polyamines, alcohols, especially polyols, acids, especially polyacids, or metal compounds.

Reactive additives of the amine type are, for example, aromatic diamines, such as 1,4-diaminobenzene, 2,4-diaminotoluene, diaminonaphthalene, bis(4-aminophenyl) sulphone, bis(4-aminophenyl) ether or bis(4-aminophenyl) methane, aliphatic or cycloaliphatic diamines, such as those of formula $H_2N-R_{13}-NH_2$, where $R_{13}$ denotes a $C_2$ to $C_{12}$ alkylene or $C_6$ to $C_{12}$ cycloalkylene radical, for example ethylenediamine, diaminopropane, diaminobutane, diaminohexane, diaminooctane, diaminodecane, diaminododecane, diaminocyclohexane, diaminocyclooctane or diaminocyclododecane, polyethylenepolyamines or polypropylenepolyamines, such as diethylenetriamine, triethylenetetramine, tetraethylenepentamine or dipropylenetriamine, or alternatively fatty amines or polyamines, that is to say amines or polyamines containing a $C_{12}$ to $C_{18}$ alkyl or alkenyl radical connected to the nitrogen atom of an amine group.

Reactive additives of the alcohol type are, in particular, polyols, such as diols or triols and especially diols of formula $HO-R_{14}-OH$, where $R_{14}$ denotes a hydrocarbon radical, especially a $C_2$ to $C_{18}$ alkylene, $C_6$ to $C_8$ arylene and $C_6$ to $C_8$ cycloalkylene radical, and polyetherdiols of formula $HO-[C_qH_{2q}O]_rH$, where q is a number ranging from 2 to 6 and especially equal to 2 or 3 and r is a number at least equal to 2 and, for example, ranging from 2 to 20. Examples of such polyols are ethylene glycol, propylene glycol, butylene glycol, diethylene glycol, triethylene glycol, tetraethylene glycol, hexanediol, octanediol or polyhydroxylated polybutadiene.

Reactive additives of the acid type are, in particular, polyacids of formula $HOOC-R_{14}-COOH$, where $R_{14}$ has the meaning given above. Examples of such polyacids are phthalic acid, terephthalic acid, malonic acid, succinic acid, adipic acid, glutaric acid or polycarboxylated polybutadiene.

Reactive additives of the metal compound type are, in particular, compounds, such as hydroxides, oxides, alkoxides, such as methoxides, ethoxides, propoxides, butoxides and in particular tert-butoxides, carboxylates, such as formates and acetates, nitrites, carbonates and bicarbonates, of metals from groups I, II, III and VIII of the Periodic Table of the Elements, especially Na, K, Li, Mg, Ca, Cd, Zn, Ba, Al or Fe.

The amount of the abovementioned reactive additive or reactive additives, which are incorporated in the reaction mixture giving rise to the functionalized polymer/bitumen compositions, can range from 0.01% to 10% and more particularly from 0.05% to 5% of the weight of bitumen present in the said reaction mixture.

It is also possible to incorporate in the mixture generating the polymer/bitumen compositions, at any point in the formation of the said mixture, additives conventionally used in polymer/bitumen compositions, such as promoters of adhesion of the polymer/bitumen composition to mineral surfaces or alternatively fillers, such as talc, carbon black or worn tyres reduced to fine powder.

In an embodiment of the preparation of the polymer/bitumen composition using a hydrocarbon oil as defined above as fluxing agent, the copolymer of styrene and of butadiene and, if they are present, the additional polymer or polymers and the coupling agent or the functionalization agent are incorporated in the bitumen or mixture of bitumens in the form of a mother solution of these products in the hydrocarbon oil constituting the fluxing agent.

The mother solution is prepared by bringing the ingredients composing it, namely hydrocarbon oil serving as solvent, copolymer of styrene and of butadiene and, if present, additional polymer(s) and coupling or functionalization agent, into contact, with stirring, at temperatures of between 10° C. and 170° C. and more particularly between 40° C. and 120° C., for a sufficient period of time, for example between 10 minutes and 2 hours, to obtain complete dissolution of the polymeric ingredients and of the coupling or functionalization agent in the hydrocarbon oil.

The respective concentrations of the copolymer of styrene and of butadiene and, if present, of the additional polymer or polymers and of the coupling or functionalization agent in the mother solution can vary fairly widely, depending, in particular, on the nature of the hydrocarbon oil used to dissolve the said polymer ingredients and the coupling agent. The mother solution advantageously contains an amount of copolymer of styrene and of butadiene representing between 5% and 40% and more particularly between 10% and 30% of the weight of the hydrocarbon oil. When it is present in the mother solution, the coupling agent or the functionalization agent is used in an amount of in particular between 0.05% and 15% and more particularly between 0.1% and 8% of the weight of the hydrocarbon oil, whereas the amount of peroxide compound in the mother solution can represent 0% to 15% of the weight of the copolymer of styrene and of butadiene contained in the said mother solution.

To prepare the polymer/bitumen compositions by resorting to the mother solution technique, the mother solution containing the copolymer of styrene and of butadiene and, if used, the additional polymer or polymers and the coupling or functionalization agent is mixed with the bitumen or mixture of bitumens, the operation being carried out at temperatures of between 100° C. and 230° C., more particularly between 120° C. and 190° C., and with stirring, this being carried out, for example, by incorporating the mother solution in the bitumen kept stirring at temperatures between 100° C. and 230° C. and more particularly between 120° C. and 190° C., and then the resulting mixture is kept stirring at temperatures of between 100° C. and 230° C., more particularly between 120° C. and 190° C., for example at the temperatures used to prepare the mixture of the mother solution with the bitumen, for a period of time at least equal to 10 minutes and generally ranging from 10 minutes to 2 hours, to form a product constituting the polymer/bitumen composition.

The amount of mother solution mixed with the bitumen or mixture of bitumens is chosen to yield the desired amounts, with respect to the bitumen, of copolymer of styrene and of butadiene, of additional polymer(s) and of coupling or functionalization agent, the said amounts being within the ranges defined above.

Immediately after it has been obtained, the polymer/bitumen composition produced by the process according to the invention can be subjected to treatment by means of an acidic adjuvant, for example composed of at least one acid chosen from phosphoric acid, sulphuric acid, polyphosphoric acids, sulphonic acids and phosphonic acids, as described in the citations FR-A-2,718,747 and FR-A-2,739,863.

The polymer/bitumen compositions obtained by the process according to the invention can be used as they are or else diluted with variable proportions of a bitumen or mixture of bitumens or of a composition according to the invention having different characteristics, in order to form polymer/bitumen binders having a chosen content of copolymer of styrene and of butadiene which can either be equal to (undiluted composition) or else lower than (diluted composition) the content of the said copolymer in the corresponding initial polymer/bitumen compositions. The dilution of the polymer/bitumen compositions according to the invention with the bitumen or mixture of bitumens or with a composition according to the invention with different characteristics can be carried out either directly following the preparation of the said compositions, when a virtually immediate use of the resulting polymer/bitumen binders is required, or else alternatively after a more or less prolonged period of storage of the polymer/bitumen compositions, when a delayed use of the resulting polymer/bitumen binders is envisaged. The bitumen or mixture of bitumens used for the dilution of a polymer/bitumen composition according to the invention can be chosen from the bitumens defined above as being suitable for the preparation of polymer/bitumen compositions. If appropriate, the bitumen or mixture of bitumens used for the dilution can itself have been pretreated with an acidic adjuvant as mentioned above.

The dilution of a polymer/bitumen composition by a bitumen or mixture of bitumens or by a second composition according to the invention with a lower content of polymer (copolymer of styrene and of butadiene and, if present, additional polymer), in order to form a polymer/bitumen binder with a chosen content of polymer lower than that in the polymer/bitumen composition to be diluted, is generally carried out by bringing into contact, with stirring and at temperatures of between 100° C. and 230° C. and more particularly between 120° C. and 190° C., suitable proportions of the polymer/bitumen composition to be diluted and of bitumen or mixture of bitumens or of second polymer/bitumen composition according to the invention.

The polymer/bitumen binders composed of the polymer/bitumen compositions according to the invention or resulting from the dilution of the said compositions by a bitumen or mixture of bitumens or by another polymer/bitumen composition according to the invention, up to the desired content of polymer(s) in the said binders, can be applied, directly or after conversion into aqueous emulsion, to the production of road surfacings, in particular of the surface coating type, to the production of bituminous mixes which are put in place with heating or cold, or else to the production of watertight facings.

The invention is illustrated by the following examples, given without implied limitation.

In these examples, the amounts and percentages are expressed by weight, except when otherwise indicated.

In addition, the rheological and mechanical characteristics of the bitumens or polymer/bitumen compositions to which reference is made in the said examples, namely penetrability, ring-and-ball softening point, Pfeiffer's number (PN) and tensile characteristics ($\sigma_b$ and $\epsilon_b$), are those defined above.

EXAMPLES 1 TO 9

Control polymer/bitumen compositions (Examples 1 to 4) were prepared, as well as polymer/bitumen compositions according to the invention (Examples 5 to 9), in order to evaluate and compare the physicomechanical characteristics thereof.

The preparations were carried out under the following conditions:

Example 1

(control):

950 parts of a bitumen having a penetrability, determined according to the conditions of NF Standard T 66004, of 65 and 50 parts of a diblock copolymer of styrene and of butadiene (copolymer SB1), having a weight-average molecular mass of 120,000 and containing, by weight, 25% of styrene and 75% of butadiene, including an amount of units containing a 1,2 double bond representing 9% of the copolymer, were introduced into a reactor maintained at 175° C. and with stirring. The contents of the reactor were subsequently maintained at 175° C. with stirring for a period of time equal to 2.5 hours, in order to form a homogeneous mass (polymer/bitumen component). 1.3 parts of sulphur were then added to the said mass and the reaction mixture thus formed was maintained at 175° C. for 3 hours in order to produce a crosslinked polymer/bitumen composition.

Example 2

(control):

A crosslinked polymer/bitumen composition was prepared, the preparation being carried out as described in Example 1, and then the said composition was diluted with an appropriate amount of the same bitumen as that used in Example 1, in order to obtain a diluted crosslinked polymer/bitumen composition containing 3.5% of copolymer SB1.

Example 3

(control):

A crosslinked polymer/bitumen composition was prepared, the preparation being carried out as described in Example 1, with, however, replacement of the copolymer SB1 by a diblock copolymer of styrene and of butadiene with a random junction (copolymer SB3) having a weight-average molecular mass of 280,000 and containing 15% of styrene, including 10% in the block form, and 85% of butadiene, including 8% in the form of units containing a 1,2 double bond.

Example 4

(control):

A crosslinked polymer/bitumen composition was prepared, the preparation being carried out as described in Example 3, and then the said composition was diluted with an appropriate amount of the same bitumen as that used in Example 1, in order to obtain a diluted crosslinked polymer/bitumen composition containing 3.5% of copolymer SB3.

Example 5
(according to the invention):

A crosslinked polymer/bitumen composition was prepared, the preparation being carried out as described in Example 1, with, however, replacement of the copolymer SB1 by a diblock copolymer of styrene and of butadiene (copolymer SB5) having a weight-average molecular mass of 120,000 and containing 25% of styrene and 75% of butadiene, including an amount in the form of units containing a 1,2 double bond representing 30% of the copolymer.

Example 6
(according to the invention):

A crosslinked polymer/bitumen composition was prepared, the preparation being carried out as described in Example 5, and then the said composition was diluted with an appropriate amount of the same bitumen as that used in Example 1, in order to obtain a diluted crosslinked polymer/bitumen composition containing 3.5% of copolymer SB5.

Example 7
(according to the invention):

A crosslinked polymer/bitumen composition was prepared, the preparation being carried out as in Example 1, with, however, replacement of the copolymer SE1 by a diblock copolymer of styrene and of butadiene with a random junction (copolymer SB7) having a weight-average molecular mass of 150,000 and containing 25% of styrene, including 17% in block form, and 75% of butadiene, including an amount in the form of units containing a 1,2 double bond representing 35% of the copolymer.

Example 8
(according to the invention):

A crosslinked polymer/bitumen composition was prepared, the preparation being carried out as described in Example 7, and then the said composition was diluted with an appropriate amount of the same bitumen as that used in Example 1, in order to obtain a diluted cross-linked polymer/bitumen composition containing 3.5% of copolymer SB7.

Example 9
(according to the invention):

A functionalized polymer/bitumen composition was prepared, the preparation being carried out as described in Example 1, with, however, replacement of the sulphur by 3 parts of a functionalization agent composed of 3,3'-dithiodipropionic acid of formula HOOC—$CH_2$—$CH_2$—S—S—$CH_2$—$CH_2$—COOH and use of 35 parts of the diblock copolymer of styrene and of butadiene of Example 7, in order to obtain a functionalized polymer/bitumen composition containing 3.5% of copolymer.

For each of the compositions prepared as indicated in Examples 1 to 9, the following characteristics were determined:

penetrability at 25° C. (Pen.), ring-and-ball softening temperature (RBT)

Pfeiffer's number (PN), breaking stress $\sigma_b$ and elongation at break $\epsilon_b$, the corresponding tensile test being carried out at 5° C. with a rate of 500 mm/minute.

The results obtained are collated in the table below.

The contents of copolymer in the compositions are expressed as percentages by weight of the overall amounts of bitumen and polymer.

TABLE

| Examples | 1 | 2 | 3 | 4 | 5 | 6 | 7 | 8 | 9 |
|---|---|---|---|---|---|---|---|---|---|
| SB1 (%) | 5 | 3.5 | | | | | | | |
| SB3 (%) | | | 5 | 3.5 | | | | | |
| SB7 (%) | | | | | | | 5 | 3.5 | 3.5 |
| Pen (1/10 mm) | 52 | 56 | 49 | 53 | 53 | 53 | 45 | 54 | 55 |
| RET (° C.) | 66.8 | 56 | 79.7 | 64 | 71.3 | 64 | 79.8 | 64.4 | 66 |
| PN | 2.2 | 0.6 | 4.2 | 1.9 | 3.2 | 1.9 | 4 | 2.1 | 2.4 |
| $\sigma_r$ (daN/$cm^2$) | 13.7 | 10.8 | 13.5 | 11.5 | 14.1 | 12 | 16.5 | 14.2 | 14.5 |
| $\epsilon_b$ (%) | >700 | >700 | >700 | >700 | >700 | >700 | >700 | >700 | >700 |

In the light of the characteristics collated in the table, it is apparent that:

at equal molecular mass and identical overall content of butadiene, a higher proportion of butadiene units containing a 1,2 double bond in the styrene/butadiene copolymer results in an improvement in the physical characteristics (increase in the RBT value, in the penetrability index and in the Pfeiffer's number) of the crosslinked polymer/bitumen composition, as emerges from a comparison of the results of Examples 5 and 6 according to the invention with the results of the corresponding control Examples 1 and 2 respectively;

for a styrene/butadiene copolymer of relatively high molecular mass, a higher proportion of butadiene units containing a 1,2 double bond in the copolymer very markedly improves the physical properties of the crosslinked polymer/bitumen composition including the said copolymer, up to exceeding the corresponding properties of a crosslinked polymer/bitumen composition obtained from a styrene/butadiene copolymer of very high molecular mass, as emerges from a comparison of the results of Examples 7 and 8 with the results of the corresponding control Examples 3 and 4 respectively.

More generally, it is apparent that the use according to the invention of a styrene/butadiene copolymer, in particular of a styrene/butadiene block copolymer, having the overall content by weight of butadiene and the specific content of butadiene units containing a 1,2 double bond defined above, in the preparation of crosslinked polymer/bitumen compositions, is reflected by a substantial improvement in the consistency and in the elastomeric properties of the said polymer/bitumen compositions.

What is claimed is:

1. Process for the preparation of polymer/bitumen compositions with reinforced mechanical properties, which comprises contacting, at temperatures of between 100 C. and 230 C. and with stirring for a period of time of at least 10 minutes, a bitumen or mixture of bitumens with, with respect to the weight of the bitumen or mixture of bitumens, 0.1% to 30% of a copolymer of styrene and butadiene containing 50% to 95% of units from butadiene, and having a proportion of units containing a 1,2 double bond resulting from butadiene of between 12% and 50% by weight of the copolymer, with an amount of a crosslinking agent sufficient to effect crosslinking selected from the group consisting of (i) sulphur-donor coupling agents, (ii) functionalization agents selected from the group consisting of carboxylic acids containing thiol or disulphide groups and carboxylic esters containing thiol or disulphide groups and (iii) peroxide compounds generating free radicals at temperatures of between 100 C. and 230 C.

2. Process according to claim 1, wherein the copolymer of styrene and of butadiene contains 20% to 40% by weight of units containing a 1,2 double bond resulting from butadiene.

3. Process according to claim 1, wherein the copolymer of styrene and of butadiene contains 60% to 95% of units resulting from butadiene.

4. Process according to claim 1, wherein the copolymer of styrene and of butadiene is a linear or star block copolymer, with or without a random junction.

5. Process according to claim 1, wherein the copolymer of styrene and of butadiene exhibits a weight-average molecular weight of between 10,000 and 600,000 daltons.

6. Process according to claim 1, wherein the amount of copolymer of styrene and of butadiene used represents 0.3% to 20% of the weight of the bitumen or mixture of bitumens.

7. Process according to claim 1, wherein the bitumen or mixture of bitumens is chosen from bitumens having a kinematic viscosity at 100° C. of between $0.5 \times 10^{-4}$ m$^2$/s and $3 \times 10^{-2}$ m$^2$/s.

8. Process according to claim 7, wherein the bitumen or mixture of bitumens exhibits a penetrability at 25° C., defined according to NF Standard T 66004, of between 5 and 900.

9. Process according to claim 1, wherein, during the preparation of the polymer/bitumen composition, one or more additional polymers, other than the copolymer of styrene and of butadiene, are incorporated therein, the overall amount of additional polymer(s) being between 0.3% and 20% of the weight of the bitumen in the said composition.

10. Process according to claim 1 wherein the crosslinking agent is a sulphur-donor coupling agent in order to produce a crosslinked bitumen/polymer composition, said coupling agent being selected from the group consisting of elemental sulphur, hydrocarbyl polysulphides, sulphur-donor vulcanization accelerators, mixtures of such products with one another and mixtures of at least one of these products with at least one vulcanization accelerator which is not a sulphur donor.

11. Process according to claim 10, wherein the sulphur-donor coupling agent is selected from the group consisting of (i) the products M, which contain, by weight, from 0% to 100% of a component CA composed of at least one sulphur-donor vulcanization accelerator and from 100% to 0% of a component CB composed of at least one vulcanization agent selected from the group consisting of elemental sulphur and hydrocarbyl polysulphides, and (ii) the products N, which contain a component CC composed of at least one vulcanization accelerator which is not a sulphur donor and one product M in a ratio by weight of the component CC to the product M ranging from 0.01 to 1.

12. Process according to claim 1, wherein the coupling agent is used in an amount appropriate for providing an amount of free sulphur representing 0.1% to 20% of the weight of the copolymer of styrene and of butadiene used to produce the crosslinked polymer/bitumen composition.

13. Process according to claim 1, wherein the crosslinking agent is a carboxylic acid or ester containing thiol or disulphide groups functionalization agent for forming a functionalized polymer/bitumen composition, the said functionalization agent being chosen from compounds of formula

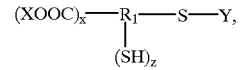

in which Y denotes a hydrogen atom or a monovalent residue

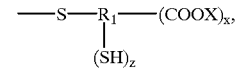

$R_1$ denotes an (x+z+1)-valent $C_1$ to $C_{12}$, hydrocarbon radical, X represents H or a monovalent $C_1$ to $C_{12}$ hydrocarbon radical, z is equal to zero or one and x is an integer having a value ranging from 1 to 3 with x+y≦3.

14. Process according to claim 13, wherein the functionalization agent is used in an amount of between 0.01% and 6% of the weight of the bitumen or mixture of bitumens employed, in order to produce the functionalized polymer/bitumen composition.

15. Process according to claim 1 wherein the crosslinking agent is a dihydrocarbyl peroxide which generates free radicals at temperatures of between 100 C. and 230 C. and is used alone, in order to form a crosslinked bitumen/polymer composition, or in combination with the functionalization agent, to form a functionalized bitumen/polymer composition.

16. Process according to claim 15, wherein the peroxide compound is used in an amount ranging up to 15% by weight of the copolymer of styrene and of butadiene.

17. Process according to claim 15, wherein the crosslinked or functionalized polymer/bitumen component is prepared by bringing the copolymer of styrene and of butadiene and, in the event of use, the additional polymer or polymers into contact with the bitumen or mixture of bitumens, in the desired proportions, the operation being carried out at temperatures of between 100° C. and 230° C., and with stirring, for a period of time of at least 10 minutes and the coupling or functionalization agent is then incorporated, in the desired amount, in the product obtained, which constitutes a non-crosslinked polymer/bitumen component, and the whole mixture is kept stirring at temperatures of between 100° C. and 230° C., for a period of time of at least 10 minutes to form a reaction mass constituting the crosslinked or functionalized polymer/bitumen component.

18. Process according to claim 1, wherein, during its preparation, the polymer/bitumen composition has added to it 1% to 40% by weight of the bitumen, of a fluxing agent.

19. Process according to claim 18, wherein the fluxing agent is composed of a hydrocarbon oil which has an atmospheric pressure distillation range, determined according to ASTM Standard D 86-67, of between 100° C. and 600° C. the said hydrocarbon oil being, a petroleum cut of aromatic nature, a petroleum cut of naphtheno-aromatic nature, a petroleum cut of naphtheno-paraffinic nature, a petroleum cut of paraffinic nature, a coal oil or alternatively an oil of plant origin.

20. Process according to claim 19, wherein the copolymer of styrene and of butadiene and, if they are present, the additional polymer or polymers and the coupling or functionalization agent are incorporated in the bitumen or mixture of bitumens in the form of a mother solution of these products in the hydrocarbon oil constituting the fluxing agent.

21. Process according to claim 20, wherein the mother solution is mixed with the bitumen or mixture of bitumens, the operation being carried out at temperatures of between 100° C. and 230° C., and with stirring, and then the resulting mixture is kept stirring at temperatures of between 100° C. and 230° C., for a period of time of at least 10 minutes to produce the polymer/bitumen composition.

22. Process according to claim 13, wherein, during its preparation, the polymer/bitumen composition has added to it one or more additives capable of reacting with the functional groups of the functionalized copolymer of styrene and of butadiene, the said reactive additives being primary or secondary amines, polyamines, alcohols, polyols, acids polyacids, or compounds of metals from groups I, II, III and VIII of the Periodic Table of the Elements.

23. Process according to claim 22, wherein the amount of reactive additive or of reactive additives incorporated in the mixture giving rise to the polymer/bitumen composition represents 0.01% to 10% of the weight of the bitumen or mixture of bitumens.

24. A mother solution, which can be used for the preparation of crosslinked bitumen/polymer compositions, comprising:
(a) a hydrocarbon oil which exhibits an atmospheric pressure distillation range, determined according to ASTM Standard D 86-87, of between 100 C. and 600 C.,
(b) between 5% and 40% based on the weight of the oil, of a copolymer of styrene and of butadiene containing 50% to 95% by weight of units resulting from butadiene, and having a proportion of units containing a 1,2 double bond resulting from butadiene of between 12% and 50% by weight of the said copolymer, and
(c) a crosslinking agent composed of at least one compound selected from the group consisting of (i) sulphur-donor coupling agents, (ii) functionalization agents selected from the group consisting of carboxylic acids containing thiol or disulphide groups and carboxylic esters containing thiol or disulphide groups and (iii) peroxide compounds generating free radicals at temperatures of between 100 C. and 230 C., the amount of sulphur-donor coupling agent or of functionalization agent representing between 0.05% and 15% by weight of the oil and the amount of peroxide compound representing 0% to 15% by weight of the copolymer.

25. Mother solution according to claim 24, wherein the copolymer of styrene and of butadiene contains 20% to 40% by weight of units containing a 1,2 double bond resulting from butadiene.

26. Mother solution according to claim 24, characterized in that the copolymer of styrene and of butadiene contains 60% to 95% of units resulting from butadiene.

27. Mother solution according to claim 24, wherein the copolymer of styrene and of butadiene is a linear or star block copolymer, with or without a random junction.

28. Mother solution according to claim 24, wherein the copolymer of styrene and of butadiene exhibits a weight-average molecular weight of between 10,000 and 600,000 daltons.

29. A process according to claim 5 wherein the copolymer of styrene and of butadiene has a weight-average molecular weight of between 30,000 and 400,000 daltons.

30. A process according to claim 6 wherein the amount of copolymer of styrene and of butadiene represents 0.5% to 10% of the weight of the bitumen or mixture of bitumens.

31. A process according to claim 7 wherein the bitumen or mixture of bitumens is selected from bitumens having a kinematic viscosity at 100 C. of between $1\times10^{-4}$ m$^2$/s and $2\times10^{-2}$ m$^2$/s.

32. A process according to claim 8 wherein the bitumen or mixture of bitumens has a penetrability of between 10 and 400.

33. A process according to claim 9 wherein the overall amount of additional polymer(s) is between 0.5% and 10% of the weight of the bitumen in the composition.

34. A process according to claim 13 wherein the coupling agent is used in an amount appropriate for providing an amount of free sulphur representing 0.5% to 10% of the weight of the copolymer of styrene and of butadiene used to produce the crosslinked bitumen/polymer composition.

35. A process according to claim 14 wherein in the formula of the functionalization agent, the radical $R_1$ is an (x+z+1)-valent $C_1$ to $C_8$ hydrocarbon radical.

36. A process according to claim 14 wherein in the formula of the functionalization agent, the symbol X represents a monovalent $C_1$ to $C_8$ hydrocarbon radical.

37. A process according to claim 14 wherein in the formula of the functionalization agent, the symbol X is equal to 1 or 2 with X+Y≦3.

38. A process according to claim 15 wherein the functionalization agent is used in an amount of between 0.05% and 3% of the weight of the bitumen or mixture of bitumens.

39. A process according to claim 20 wherein the fluxing agent is 2% to 30% by weight of the bitumen.

40. A process according to claim 23 wherein the amount of reactive additive or of reactive additives represents 0.05% to 5% of the weight of the bitumen or mixture of bitumens.

41. A mother solution according to claim 24 wherein the copolymer of styrene and of butadiene has a weight-average molecular weight of between 30,000 and 400,000 daltons.

42. A mother solution according to claim 24 containing an amount of copolymer of stryene and of butadiene representing between 10% and 30% of the weight of the hydrocarbon oil.

43. A mother solution according to claim 24 containing, by weight of the hydrocarbon oil, between 0.1% and 8% of a sulphur-donor coupling agent or a functionalization agent.

44. A process for coating road surfaces which comprises applying to the road surfaces bitumen/polymer binders comprised of the compositions according to claim 1 or said compositions diluted with a bitumen or mixture of bitumens, which bitumen/polymer binders are applied directly or after conversion into aqueous emulsion, to the road surfaces.

* * * * *